United States Patent
Lu et al.

(10) Patent No.: US 11,027,261 B2
(45) Date of Patent: Jun. 8, 2021

(54) FUNCTIONALIZED HYBRID NANOTUBE C@MOS₂/SNS₂ AND PREPARATION METHOD AND APPLICATION THEREOF

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 245 days.

(21) Appl. No.: 16/427,095

(22) Filed: May 30, 2019

(65) Prior Publication Data

US 2019/0366309 A1    Dec. 5, 2019

(30) Foreign Application Priority Data

May 31, 2018   (CN) .......................... 201810548121.8

(51) Int. Cl.
| | |
|---|---|
| *B01J 37/10* | (2006.01) |
| *B01J 27/051* | (2006.01) |
| *B01J 35/00* | (2006.01) |
| *B01J 37/00* | (2006.01) |
| *B01J 37/34* | (2006.01) |
| *C02F 1/30* | (2006.01) |

(Continued)

(52) U.S. Cl.
CPC .......... *B01J 27/051* (2013.01); *B01J 35/004* (2013.01); *B01J 35/0013* (2013.01); *B01J 37/009* (2013.01); *B01J 37/10* (2013.01); *B01J 37/343* (2013.01); *C02F 1/30* (2013.01); *C02F 1/70* (2013.01); *C02F 2101/20* (2013.01); *C02F 2305/08* (2013.01); *C02F 2305/10* (2013.01)

(58) Field of Classification Search
CPC ........ B01J 37/084; B01J 34/004; B01J 37/10; C02F 1/30; C02F 1/70; Y02W 10/37
See application file for complete search history.

(56) References Cited

FOREIGN PATENT DOCUMENTS

| CN | 105271185 A | * | 1/2016 |
|---|---|---|---|
| CN | 108795041 A | * | 11/2018 |

* cited by examiner

*Primary Examiner* — Walter D. Griffin
*Assistant Examiner* — Cameron J Allen
(74) *Attorney, Agent, or Firm* — SZDC Law P.C.

(57) ABSTRACT

The invention discloses a functionalized hybrid nanotube C@MoS₂/SnS₂ and preparation method and application thereof. Dissolving ammonium molybdate tetrahydrate in water under ultrasound, adding ethylenediamine with stirring, and then adding dilute hydrochloric acid dropwise to react to obtain MoO₃-EDA nanowires; adding L-cysteine and glucose into water containing MoO₃-EDA nanowires, and obtaining a dispersion by ultrasonication; heating the dispersion and then centrifuging, then drying the solid matter and then calcining to obtain C@MoS₂ nanotubes; adding C@MoS₂ nanotubes into water containing SnCl₄.5H₂O and KSCN, and hydrothermally reacting to obtain functionalized hybrid nanotubes C@MoS₂/SnS₂. The invention realizes photocatalytic reduction of heavy metal ions to achieve treatment of heavy metal ion solution.

12 Claims, 3 Drawing Sheets

(51) Int. Cl.
*C02F 1/70* (2006.01)
*C02F 101/20* (2006.01)

FUNCTIONALIZED HYBRID NANOTUBE C@MOS$_2$/SNS$_2$ AND PREPARATION METHOD AND APPLICATION THEREOF

This application claims priority to Chinese Patent Application No.: 201810548121.8, filed on May 31, 2018, which is incorporated by reference for all purposes as if fully set forth herein.

FIELD OF THE INVENTION

The present invention belongs to the field of preparation of nano composite materials, and particularly relates to a novel functionalized hybrid nanotube C@MoS$_2$/SnS$_2$ and a preparation method thereof and the application of catalytic treatment for heavy metal ions.

TECHNICAL BACKGROUND

The high toxicity and carcinogenicity of heavy metal pollution have turned it into a global environmental problem. The high toxicity of heavy metals means that they can cause serious damage to ecosystems even at low concentrations. However, some heavy metals, such as Cr, are widely used in the metal cleaning, electroplating, paint, tanning and fertilizer industries, therefore, it is very important and necessary to explore how to efficiently remove heavy metal ions from industrial wastewater.

Among the various photocatalysts known today, titanium dioxide (TiO$_2$) is a mature and widely studied oxide semiconductor photocatalyst. However, TiO$_2$ also has its own disadvantages such as a forbidden band width of 3.2 eV, so its capture rate of visible light is fairly low. In other words, TiO$_2$ is hardly responsive to visible and near-infrared light.

SUMMARY OF THE INVENTION

The object of the present invention is to introduce a novel functionalized hybrid nanotube C@MoS$_2$/SnS$_2$ and its preparation method and visible light catalysis and reduction of heavy metal ions, and the SnS$_2$ semiconductor photocatalyst is modified by in-situ growth onto the layered MoS$_2$ to obtain C@MoS$_2$/SnS$_2$ nanocomposite to realize photocatalytic reduction of heavy metal ions to achieve treatment of heavy metal ion solution.

In order to achieve the above object, the present invention provides a preparation method as follows:

A preparation method of a functionalized hybrid nanotube C@MoS$_2$/SnS$_2$, comprising the following steps:

(1) dissolving ammonium molybdate tetrahydrate in water under ultrasound, adding ethylenediamine with stirring, and then adding dilute hydrochloric acid dropwise to react to obtain MoO$_3$-EDA nanowires;

(2) adding L-cysteine and glucose into water containing MoO$_3$-EDA nanowires, and obtaining a dispersion by ultrasonication; heating the dispersion and then centrifuging, then drying the solid matter and then calcining to obtain C@MoS$_2$ nanotubes;

(3) adding C@MoS$_2$ nanotubes into water containing SnCl$_4$.5H$_2$O and KSCN, and hydrothermally reacting to obtain functionalized hybrid nanotubes C@MoS$_2$/SnS$_2$.

The present invention also discloses a preparation method of C@MoS$_2$ nanotubes, comprising the following steps:

(1) dissolving ammonium molybdate tetrahydrate in water under ultrasound, adding ethylenediamine with stirring, and then adding dilute hydrochloric acid dropwise to react to obtain MoO$_3$-EDA nanowires;

(2) adding L-cysteine and glucose into water containing MoO$_3$-EDA nanowires, and obtaining a dispersion by ultrasonication; heating the dispersion and then centrifuging, then drying the solid matter and then calcining to obtain C@MoS$_2$ nanotubes.

The present invention also discloses a method for photocatalytic treatment of heavy metal ions, comprising the following steps:

(1) dissolving ammonium molybdate tetrahydrate in water under ultrasound, adding ethylenediamine with stirring, and then adding dilute hydrochloric acid dropwise to react to obtain MoO$_3$-EDA nanowires;

(2) adding L-cysteine and glucose into water containing MoO$_3$-EDA nanowires, and obtaining a dispersion by ultrasonication; heating the dispersion and then centrifuging, then drying the solid matter and then calcining to obtain C@MoS$_2$ nanotubes;

(3) adding C@MoS$_2$ nanotubes into water containing SnCl$_4$.5H$_2$O and KSCN, and hydrothermally reacting to obtain functionalized hybrid nanotubes C@MoS$_2$/SnS$_2$;

(4) adding the functionalized hybrid nanotubes C@MoS$_2$/SnS$_2$ to a solution containing heavy metal ions and irradiated to realize photocatalytic treatment of heavy metal ions.

In above technical solution, in step (1), the mass ratio of ammonium molybdate tetrahydrate and ethylenediamine is (1.5 to 1.6):1; the concentration of dilute hydrochloric acid is 1 mol/L; the reaction temperature is 50° C., and the reaction time is 2 hours.

In above technical solution, in step (2), the mass ratio of the L-cysteine, glucose, and MoO$_3$-EDA nanowires is (5-6):3:2; heating for 12 h at 200° C.; calcination is carried out for 2 h at 700° C. under nitrogen.

In above technical solution, in step (3), the mass ratio of SnCl$_4$.5H$_2$O, C@MoS$_2$ nanotubes, and KSCN is (6.5-7):5:10; the hydrothermal reaction is carried out for 20 hours at 180° C.

In above technical solution, in step (4), the illumination is irradiated by the xenon light source.

The preparation method of the functionalized hybrid nanotube C@MoS$_2$/SnS$_2$ of the invention can be carried out as follows:

(1) Preparation of precursor MoO$_3$-EDA

First, ammonium molybdate tetrahydrate is dissolved in deionized water under ultrasound ethylenediamine is added with stirring, and dilute hydrochloric acid is slowly added, subsequently, heating at 50° C. for 2 h. The white solid products are filtered and washed with water to obtain MoO$_3$-EDA nanowires.

(2) Preparation of C@MoS$_2$/SnS$_2$ nanotubes and MoS$_2$ nanospheres

MoO$_3$-EDA is dispersed in 30 mL of deionized water with ultrasonic assistance. L-cysteine and glucose are dissolved in the above solution and ultrasound is continued. The obtained dispersion is then transferred into a autoclave, which is heated at 200° C. for 12 h. The black product is collected by centrifugation and dried. In order to obtain highly crystalline C@MoS$_2$, the above sample is placed in a tube furnace for calcination.

SnCl$_4$.5H$_2$O and KSCN are dissolved in water, add prepared C@MoS$_2$ nanotubes, and then transferred to a stainless steel autoclave hydrothermal reaction. The black product obtained after the reaction is completed is denoted C@MoS$_2$/SnS$_2$ hybrid nanotubes.

(3) Photocatalytic reduction of heavy metal ions

The photocatalytic reduction of heavy metal ions is carried out as following: the degradation effects of C@MoS$_2$/

$SnS_2$ hybrid nanotubes, $SnS_2$ and $C@MoS_2$ nanotubes (50 mg) on heavy metal ions in solution are investigated at the same concentration.

(4) Removal of heavy metal ions

In order to qualitatively study the visible light catalysis ability of $C@MoS_2/SnS_2$ hybrid nanotubes, photocatalytic treatment of different concentrations of heavy metal ion solution is carried out.

The present invention also discloses functionalized hybrid nanotubes $C@MoS_2/SnS_2$ and $C@MoS_2$ nanotubes prepared by above preparation methods; and the application of functionalized hybrid nanotubes $C@MoS_2/SnS_2$ or $C@MoS_2$ nanotubes in heavy metal treatment.

The present invention has the advantages as followed:

(1) The raw material adopted in the invention is low cost, easy to obtain. The synthesis method is easy.

(2) The $MoS_2$ material has a large surface area and high electrical conductivity, and the combination with a metal oxide or sulfide strongly promotes the visible light harvesting ability and the separation efficiency and photocatalytic activity of the excited charge.

(3) The obtained $C@MoS_2/SnS_2$ nanocomposite can improve the efficiency of solar energy utilization and photocharge transport. Photocatalytic reduction of wastewater containing heavy metal ions has better photocatalytic ability than other samples, and 100% removal efficiency can be achieved for heavy metal ions of 120 mg/L.

DETAILED DESCRIPTION OF THE INVENTION

The invention successfully manufactures $C@MoS_2/SnS_2$ nano composite material, graphene-like molybdenum disulfide ($MoS_2$) is a good option because it can adjust the photoresponse of $TiO_2$ and improve its charge carrier transport properties. Meanwhile, carbon nanotubes (CNTs) have good mechanical strength and efficient electron transport capacity and are widely used as carriers in various catalysts, which can improve the efficiency of solar energy utilization and photocharge transport ,and has good photocatalytic ability for wastewater containing heavy metal ions.

Implementation 1 Preparation of Precursor $MoO_3$-EDA, the Specific Steps are as Follows:

2.48 g of ammonium molybdate tetrahydrate is dissolved in 30 mL of deionized water under ultrasound followed 1.6 g of ethylenediamine is added with stirring. And then 1 mol/L HCl is slowly added to the supernatant until a white solid is precipitated and precipitated in a large amount, and then the resulting dispersion is heated at 50° C. for 2 h under stirring. The white solid products are filtered and washed with water to obtain $MoO_3$-EDA nanowires, which are then vacuum-dried at 50° C. for 12 h.

Implementation 2 Preparation of $C@MoS_2/SnS_2$ Nanotubes and $MoS_2$ Nanospheres, the Specific Steps are as Follows:

0.2 g of $MoO_3$-EDA is dispersed in 30 mL of deionized water with ultrasonic assistance until a milky white solution is formed. 0.56 g of L-cysteine and 0.297 g glucose are added and then dissolved under ultrasonic treatment for 1 h. The obtained dispersion is then transferred into a 50 mL Teflon-lined autoclave, which is heated at 200° C. for 12 h. The black product is collected by centrifugation and washed several times with deionized water and ethanol, and then dried in a vacuum oven at 60° C. for 12 h. To obtain highly crystalline $C@MoS_2$ and $MoS_2$ nano-flowers, the above samples are calcined in a 700° C. tube furnace under $N_2$ protection for 2 h.

The preparation process of $MoS_2$ microflowers is identical to that of $C@MoS_2$ nanotubes except for the absence of glucose. Among them, glucose mainly plays the role of carbonization, which makes the $MoS_2$ nano-microspheres carbonized at high temperature into $C@MoS_2$ nano-tubes.

Figure 1:
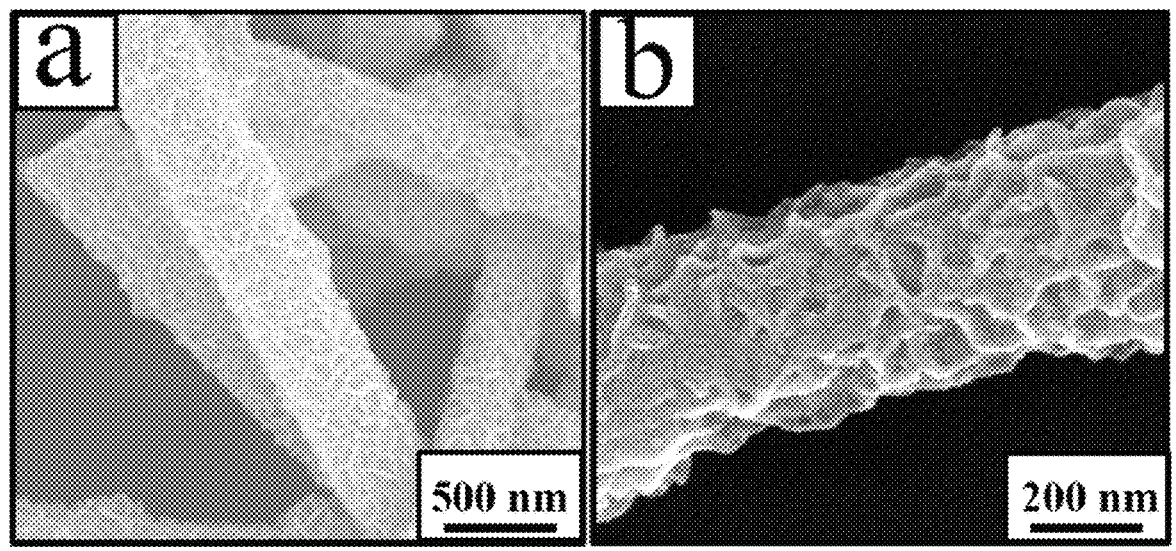
FIG. 1. Scanning electron micrograph (SEM) of $C@MoS_2$

FIG. 1 is a scanning electron micrograph of $C@MoS_2$. It can be seen from the picture that $C@MoS_2$ has a uniform particle size distribution and a surface layered structure of $MoS_2$ nanosheets.

0.66 g of $SnCl_4 \cdot 5H_2O$, and 1.0 g of KSCN are dissolved in 25 mL of water, add 500 mg prepared $C@MoS_2$ nanotubes, and then transferred to a 50 mL stainless steel autoclave hydrothermal reaction at 180° C. for 20 h. The black product obtained after the reaction is completed is denoted $C@MoS_2/SnS_2$ hybrid nanotubes.

Figure 2:
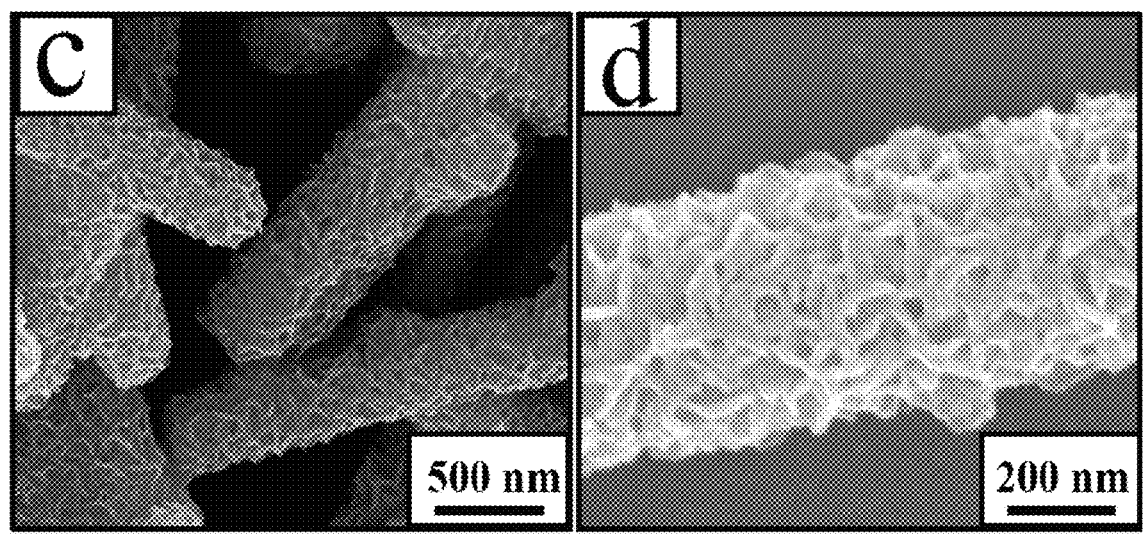
FIG. 2. Scanning electron micrograph (SEM) of $C@MoS_2/SnS_2$

FIG. 2 is a scanning electron micrograph of $C@MoS_2/SnS_2$. It can be seen from the picture that the surface of $C@MoS_2/SnS_2$ is rougher and the nanosheet layer increases.

Implementation 3 Photocatalytic Treatment of Heavy Metal Ions, the Specific Steps are as Follows:

The $C@MoS_2/SnS_2$ hybrid nanotubes, $SnS_2$ and $C@MoS_2$ nanotubes (50 mg) are added to 50 mg/L heavy metal ion with pH=2. Each sample is placed in a Xenon light source (300 W, λ>400 nm) for 90 min.

The content of heavy metal ions in the solution is analyzed by UV-vis spectrophotometry after irradiation with a xenon lamp to compare the degradation effects.

Figure 3:
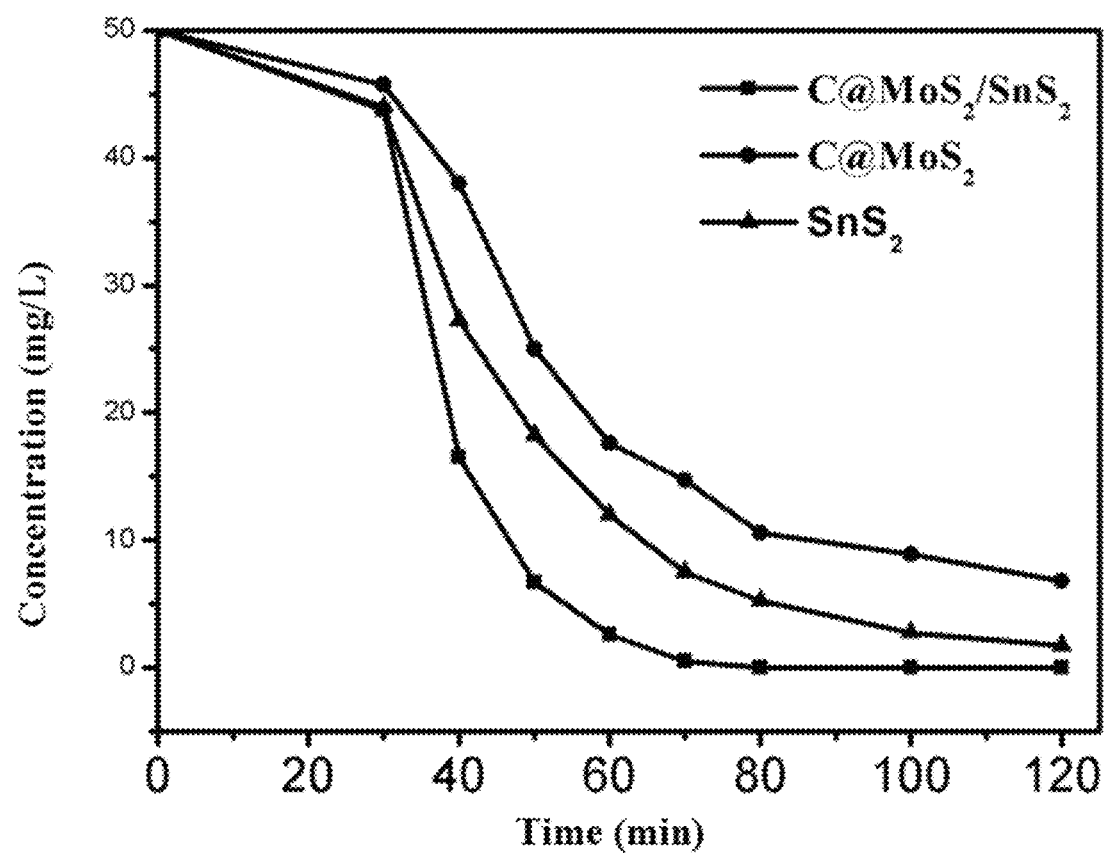
FIG. 3 shows the effect of $C@MoS_2/SnS_2$, $C@MoS_2$ and $SnS_2$ on the treatment of heavy metal ion solutions.

FIG. 3 is the reduction abilities of $C@MoS_2/SnS_2$, $C@MoS_2$, and $SnS_2$ for 50 mg/L Cr(VI) solutions, it could be found that the catalytic efficiency of $C@MoS_2/SnS_2$ for heavy metal ions in solution is significantly better than that of $C@MoS_2$ and $SnS_2$.

Implementation 4 Heavy Metal Ions Removal, the Specific Steps are as Follows:

In order to qualitatively study the visible light catalytic ability of $C@MoS_2/SnS_2$ hybrid nanotubes, different concentrations (50, 80, 100, 120, 150 mg/L) of Cr(VI) solution (50 mL) are poured into clear glass bottles and 50 mg of $C@MoS_2/SnS_2$ is added to each bottle. Then placed in a Xenon lamp light source (300 W, λ>400 nm) with stirring for 90 min. After the end of the reaction, the concentration of Cr(VI) in the solution is measured by usingl, 5-diphenylcarbazide colorimetric method. The results are as follows: for Cr(VI) solutions with concentrations of 50, 80, 100, and 120 mg/L, nearly 100% reduction could be achieved in 90 min. When the concentration of heavy metal ion solution reaches 150 mg/L, the catalytic removal rate can still be close to 87% in 90 min.

Implementation 5 The Cycle of Heavy Metal Ion Removal by $C@MoS_2/SnS_2$ Hybrid Nanotubes, the Specific Steps are as Follows:

In order to study the cycling performance of $C@MoS_2/SnS_2$ hybrid nanotubes in the treatment of wastewater containing Cr(VI), 50 mg of $C@MoS_2/SnS_2$ (cycled three times) is added to the Cr(VI) solution (50 mg/L, 50 mL), and irradiated with visible light for 90 min in the stirring. After the reaction, the content of Cr(VI) in the solution is measured using 1,5-diphenylcarbazide colorimetric method.

Figure 4:
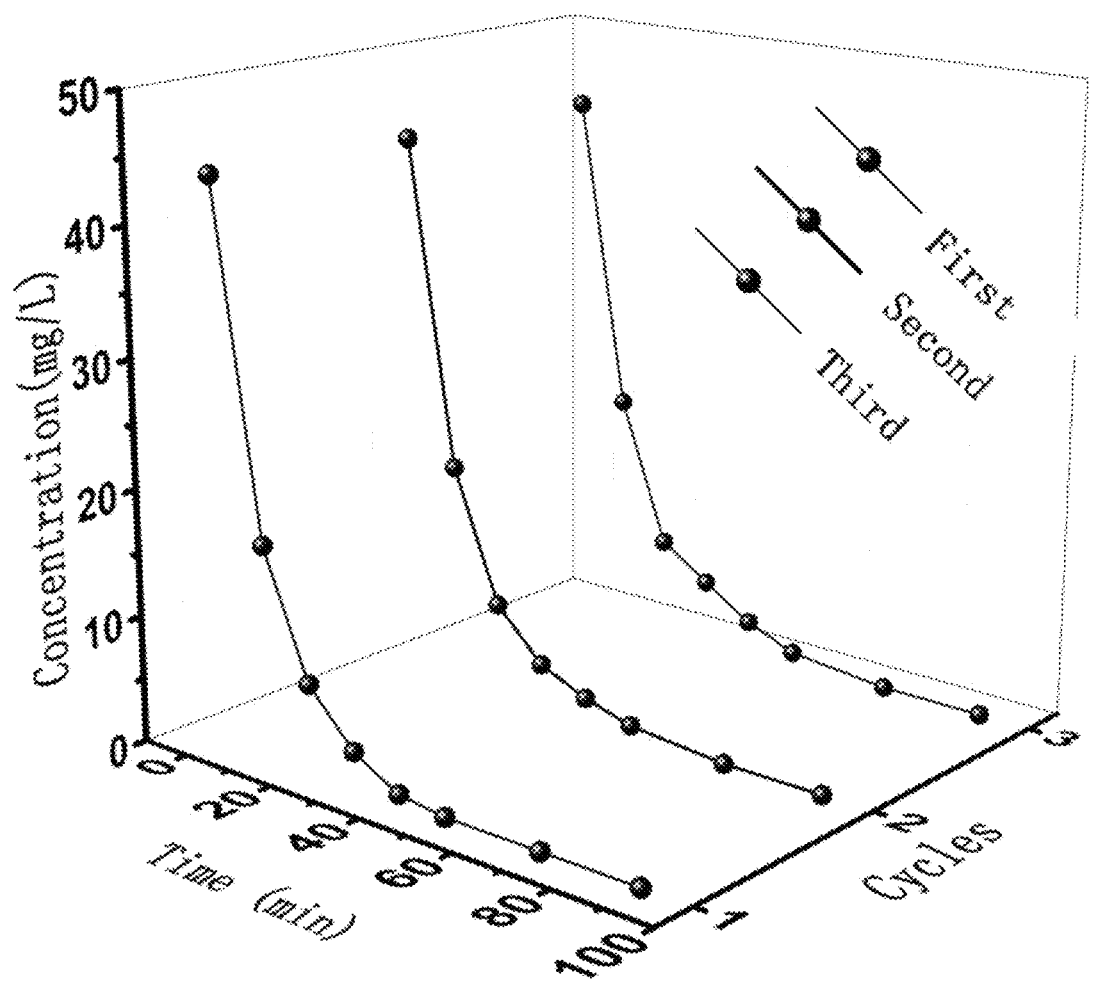
FIG. 4 shows the cycle effect of $C@MoS_2/SnS_2$ hybrid nanotubes on heavy metal ion solution.

The data for the cyclic degradation of 50 mg/L Cr(VI) solutions over the C@MoS$_2$/SnS$_2$ hybrid nanotubes are shown in FIG. 4. After three cycles using the same catalyst sample, Cr(VI) is completely reduced within 90 min. The second and third cycles of Cr(VI) degradation are less effective than the first, but the C@MoS$_2$/SnS$_2$ hybrid nanotubes still showed good degradation ability.

CONCLUSION

Through the above analysis, the invention modified SnS$_2$ onto the layered MoS$_2$ by one-pot method and in-situ growth method, and successfully prepared the C@MoS$_2$/SnS$_2$ nanocomposite. Moreover, the composite material disclosed in the invention has a strong visible light catalytic reduction for heavy metal ions in an aqueous solution, and can almost achieve a removal rate of 100%. In addition, the manufacturing process of the invention is simple, convenient, economical and environmentally friendly, and therefore has a good application prospect in wastewater treatment.

We claim:

1. A preparation method of a functionalized hybrid nanotube C@MoS$_2$/SnS$_2$, comprising the following steps:
   (1) dissolving ammonium molybdate tetrahydrate in water under ultrasound, adding ethylenediamine with stirring, and then adding dilute hydrochloric acid dropwise to react to obtain MoO$_3$-EDA nanowires;
   (2) adding L-cysteine and glucose into water containing MoO$_3$-EDA nanowires, and obtaining a dispersion by ultrasonication; heating the dispersion and then centrifuging, then drying the solid matter and then calcining to obtain C@MoS$_2$ nanotubes;
   (3) adding C@MoS$_2$ nanotubes into water containing SnCl$_4$.5H$_2$O and KSCN, and hydrothermally reacting to obtain functionalized hybrid nanotubes C@MoS$_2$/SnS$_2$.

2. A preparation method of C@MoS$_2$ nanotubes, comprising the following steps:
   (1) dissolving ammonium molybdate tetrahydrate in water under ultrasound, adding ethylenediamine with stirring, and then adding dilute hydrochloric acid dropwise to react to obtain MoO$_3$-EDA nanowires;
   (2) adding L-cysteine and glucose into water containing MoO$_3$-EDA nanowires, and obtaining a dispersion by ultrasonication; heating the dispersion and then centrifuging, then drying the solid matter and then calcining to obtain C@MoS$_2$ nanotubes.

3. A method for photocatalytic treatment of heavy metal ions, comprising the following steps:
   (1) dissolving ammonium molybdate tetrahydrate in water under ultrasound, adding ethylenediamine with stirring, and then adding dilute hydrochloric acid dropwise to react to obtain MoO$_3$-EDA nanowires;
   (2) adding L-cysteine and glucose into water containing MoO$_3$-EDA nanowires, and obtaining a dispersion by ultrasonication; heating the dispersion and then centrifuging, then drying the solid matter and then calcining to obtain C@MoS$_2$ nanotubes;
   (3) adding C@MoS$_2$ nanotubes into water containing SnCl$_4$.5H$_2$O and KSCN, and hydrothermally reacting to obtain functionalized hybrid nanotubes C@MoS$_2$/SnS$_2$;
   (4) adding the functionalized hybrid nanotubes C@MoS$_2$/SnS$_2$ to a solution containing heavy metal ions and is irradiated to realize photocatalytic treatment of heavy metal ions.

4. The method according to claim 1, wherein in step (1), the mass ratio of ammonium molybdate tetrahydrate and ethylenediamine is (1.5 to 1.6):1; the concentration of dilute hydrochloric acid is 1 mol/L; the reaction temperature is 50° C., and the reaction time is 2 hours.

5. The method according to claim 1, wherein in step (2), the mass ratio of the L-cysteine, glucose, and MoO$_3$-EDA nanowires is (5-6):3:2; heating for 12 h at 200° C.; calcination is carried out for 2 h at 700° C. under nitrogen.

6. The method according to claim 1, wherein in step (3), the mass ratio of SnCl$_4$.5H$_2$O, C@MoS$_2$ nanotubes, and KSCN is (6.5-7):5:10; the hydrothermal reaction is carried out for 20 hours at 180° C.

7. The method according to claim 3, wherein in step (4), the irradiation is irradiated by a xenon light source.

8. The method according to claim 2, wherein in step (1), the mass ratio of ammonium molybdate tetrahydrate and ethylenediamine is (1.5 to 1.6):1; the concentration of dilute hydrochloric acid is 1 mol/L; the reaction temperature is 50° C., and the reaction time is 2 hours.

9. The method according to claim 2, wherein in step (2), the mass ratio of the L-cysteine, glucose, and MoO$_3$-EDA nanowires is (5-6):3:2; heating for 12 h at 200° C.; calcination is carried out for 2 h at 700° C. under nitrogen.

10. The method according to claim 3, wherein in step (1), the mass ratio of ammonium molybdate tetrahydrate and ethylenediamine is (1.5 to 1.6):1; the concentration of dilute hydrochloric acid is 1 mol/L; the reaction temperature is 50° C., and the reaction time is 2 hours.

11. The method according to claim 3, wherein in step (2), the mass ratio of the L-cysteine, glucose, and MoO$_3$-EDA nanowires is (5-6):3:2; heating for 12 h at 200° C.; calcination is carried out for 2 h at 700° C. under nitrogen.

12. The method according to claim 3, wherein in step (3), the mass ratio of SnCl$_4$.5H$_2$O, C@MoS$_2$ nanotubes, and KSCN is (6.5-7):5:10; the hydrothermal reaction is carried out for 20 hours at 180° C.

* * * * *